2,954,662

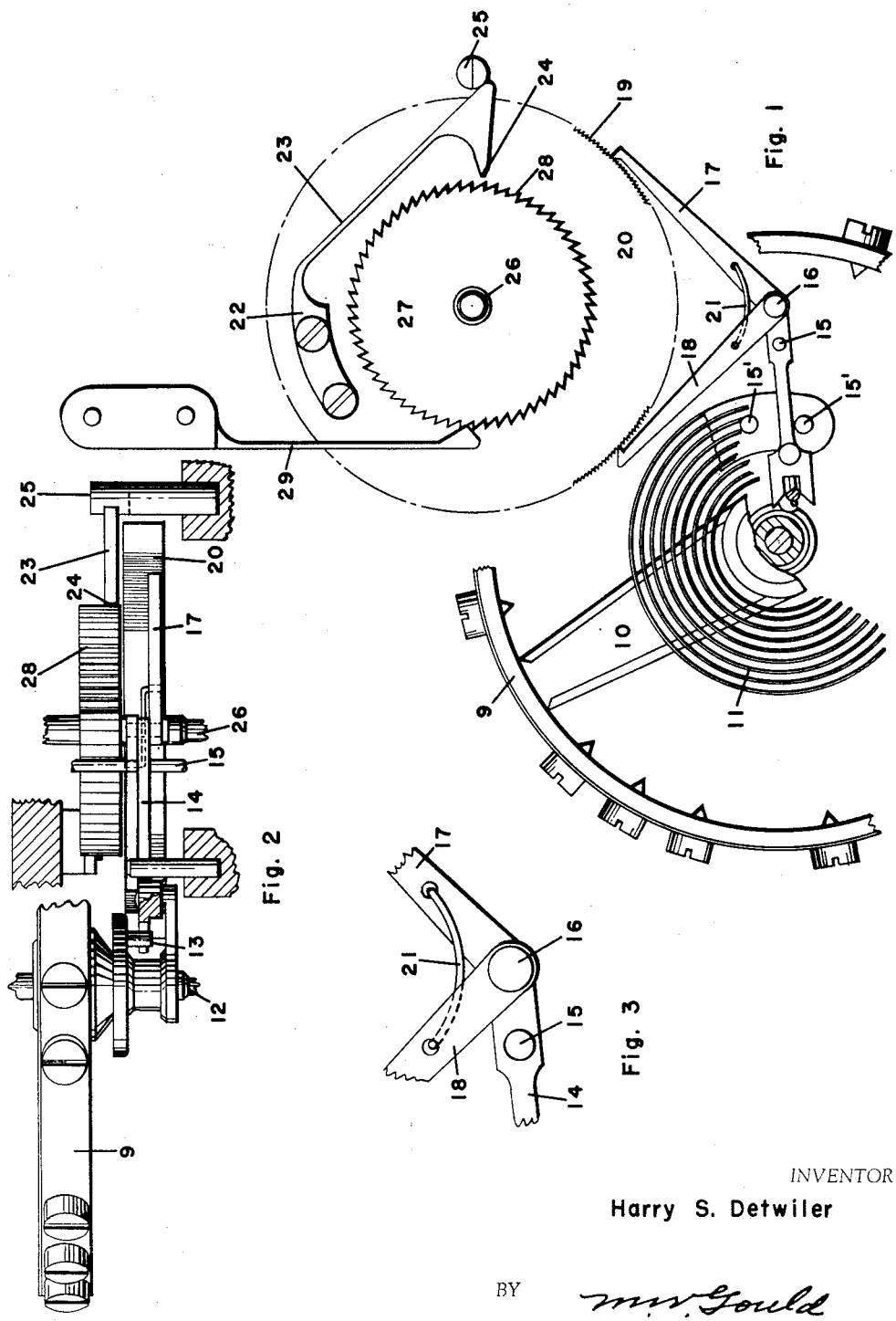

INDEXING MECHANISM

Harry S. Detwiler, Lancaster, Pa., assignor to Hamilton Watch Company, Lancaster, Pa., a corporation of Pennsylvania Filed May 23, 1955, Ser. No. 510,357

2 Claims. (Cl. 58—28)

This invention relates to an indexing mechanism for translating the oscillatory motion of the balance wheel of a watch to intermittent rotary motion of the hands.

It is the object of the present invention to provide a mechanism adapted to be used in a watch of the battery operated type wherein the balance wheel is impulsed, and the rotary motion of the hands is derived from the oscillatory motion of the balance wheel which will take the place of the time train gearing.

It is a further object of the present invention to provide a toothed wheel which is indexed in one direction only by a pair of fingers which push and pull alternately and are connected to the pallet fork, the toothed wheel shaft carrying the second hand directly.

It is a further object of the present invention to provide a toothed wheel which, in addition to carrying the second hand, is provided with an indexing spring finger which once for every revolution of the wheel is depressed by a stationary pin to index a minute wheel and subsequently a minute hand carried about the same axis as the second hand.

The invention is shown in the accompanying drawings in which:

Figure 1 is a plan view showing the assembly of the balance wheel and the indexing wheel.

Figure 2 is a side view of the same.

Figure 3 is a detail view.

Referring particularly to the drawings, a balance wheel 9 having a cross arm 10 and a hairspring 11 mounted on a balance staff 12 is the type adapted to be used in an electrically operated watch in which the balance wheel is impulsed through an electromagnetic circuit. The oscillating movement of the balance wheel is transferred through the roller jewel 13 to the pallet 14 which is pivoted at 15. Pins 15' serve to restrict the movement of the pallet.

The pallet extends beyond the pivot 15 and carries a pivot pin 16 at its end. Mounted on the pin 16 are a pair of indexing arms 17 and 18 which are adapted to engage teeth 19 of indexing wheel 20. A spring 21 normally urges the two indexing arms 17 and 18 toward each other and holds them in contact with the teeth 19 of the indexing wheel 20.

Mounted on the indexing wheel 20 by screws 22 is a spring finger 23 terminating in a tooth engaging point 24. Stationarily mounted on the pillar plate or one of the bridges of the watch is a pin 25 adapted to depress the finger 23 once for each rotation of the indexing wheel 20.

The gear 20 is mounted on a shaft 26 which supports a sweep second hand (not shown) which rotates in accord therewith. Also mounted about the shaft 26 is a minute indexing wheel 27 having teeth 28 which are engaged by the point 24 of the spring 23. The wheel 27 is rotated a distance of one tooth for each complete rotation of the wheel 20 so that a minute hand may be mounted directly on the wheel 27. A spring keeper 29 engages the teeth of the wheel 27 to stabilize the movement of the teeth maintaining a step by step motion of the minute hand.

In the normal operation of an electric watch, the balance wheel which is impulsed through an electromagnetic circuit imparts the motion to the pallet 14 through the roller pin 13. This motion is transferred to the arms 17 and 18 which alternately engage the teeth 19 of the wheel 20, one pulling and the other pushing to move the indexing wheel five times a second or once for each oscillatory movement of the balance wheel. This movement is transferred directly to a sweep second hand and by means of the spring finger 23 directly to the indexing wheel 27 which can be connected by sleeve or staff to a minute hand. The minute hand may through the usual mechanism drive the hour hand.

It will thus be seen that through the use of the fingers 17 and 18 and a pair of indexing wheels the entire train is eliminated, making it possible to make a watch thinner than previous.

What is claimed is:

1. An indexing mechanism for an electric watch having a frame and an oscillating balance wheel and staff, a pallet pivotally mounted between the ends thereof and formed with a fork at one end to engage a pin carried by said oscillating shaft to impart oscillating motion to said pallet, a pair of pins located in the path of angular movement of the pallet to restrict the motion of said pallet to the distance between said pins, a pair of arms pivotally mounted on the other end of said pallet, said arms being formed with push and pull fingers respectively at one end, spring means for normally urging the arms toward each other, a first toothed wheel mounted for engagement by the push and pull fingers of the arms to index said first toothed wheel in one direction, a second toothed wheel concentrically mounted in vertically spaced relation with said first toothed wheel, pawl means engaging said second toothed wheel normally preventing said second toothed wheel from rotating with said first toothed wheel, and means mounted on said first toothed wheel cooperating with means mounted on the frame of said watch to advance said second toothed wheel one tooth in the direction of rotation of said first toothed wheel per revolution of said first toothed wheel.

2. An indexing mechanism for an electric watch as set out in claim 1 wherein said means mounted on said first toothed wheel is a spring finger having a pointed end and said means mounted in the frame of said watch is a pin engageable by said spring finger to force the pointed end of said spring finger into engagement with the teeth of said second toothed wheel thereby overcoming said pawl means and advancing said second toothed wheel by one tooth.

References Cited in the file of this patent

UNITED STATES PATENTS

| 1,252,826 | Missiter | Jan. 8, 1918 |
| 2,371,387 | Fink | Mar. 13, 1945 |
| 2,579,166 | Youhouse | Dec. 18, 1951 |
| 2,696,073 | Langel | Dec. 7, 1954 |

FOREIGN PATENTS

| 123,938 | Great Britain | Mar. 13, 1919 |
| 680,532 | France | May 1, 1930 |
| 802,144 | Germany | Feb. 5, 1951 |
| 280,556 | Switzerland | May 1, 1952 |